United States Patent Office 3,423,451
Patented Jan. 21, 1969

3,423,451
N-(THIOCYANATOALKYL)HALOPHENOXYACYL-
AMIDES
William E. Weesner, Kettering, Ohio, assignor to
Monsanto Research Corporation, St. Louis, Mo.,
a corporation of Delaware
No Drawing. Filed Jan. 3, 1966, Ser. No. 517,962
U.S. Cl. 260—454                4 Claims
Int. Cl. C07c *161/02;* A61k *27/02;* A01n *9/18*

This invention relates to organic compounds of halogen and nitrogen and more particularly provides a new and valuable class of thiocyanatoalkyl nitrogen-substituted halophenoxyacylamides, the method of preparing the same, and the use of these compounds as biological toxicants.

According to the invention, the N-(thiocyanatoalkyl)-halophenoxyacylamides are prepared by the reaction of an N-(bromoalkyl)halophenoxyacylamide with an alkali metal thiocyanate as shown in the following equation:

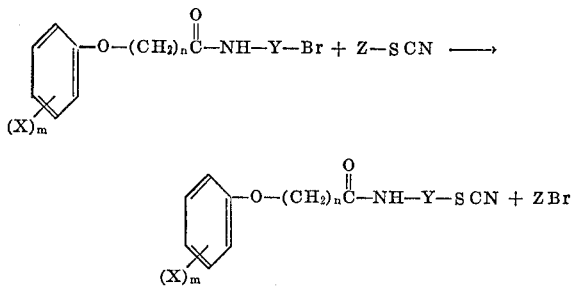

wherein X is halogen having an atomic weight greater than 30, Y is alkylene having from 2 to 5 carbon atoms, Z is alkali metal, $m$ is an integer of from 1 to 5, and $n$ is an integer of from 1 to 3.

Presently useful N - (bromoalkyl)halophenoxyacylamides are
N-(2-bromoethyl)-2-(p-bromophenoxy)acetamide,
N-(2-bromoethyl)-2-(p-chlorophenoxy)acetamide,
N-(2-bromoethyl)-2-(2,4-dichlorophenoxy)acetamide,
N-(2-bromoethyl)-2-(2,4,5-trichlorophenoxy)acetamide,
N-(3-bromopropyl)-2-(2,4-dichlorophenoxy)acetamide,
N-(3-bromopropyl)-3-(p-chlorophenoxy)propionamide,
N-(4-bromobutyl)-4-pentachlorophenoxy)butyramide, and
N-(5-bromoamyl)-2-(o-iodophenoxy)acetamide.

These bromoalkyl compounds are conveniently prepared by the method of Djerassi and Scholz, J. Org. Chem. 15, 694 (1950), e.g., according to the scheme:

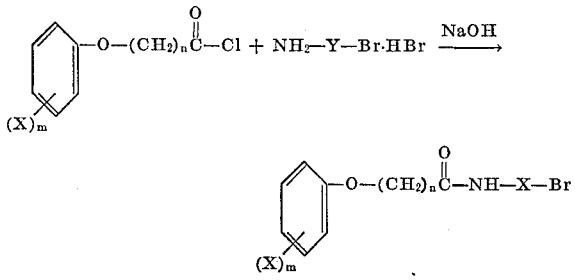

Examples of the suitable alkali metal thiocyanates include sodium, potassium, lithium or rubdium thiocyanate. N - (thiocyanatoalkyl)halophenoxyacylamides provided by the invention are:

N-[2-(thiocyanato)ethyl]-2-(p-bromophenoxy)acetamide,
N-[2-(thiocyanato)ethyl]-2-(p-chlorophenoxy)acetamide,
N-[2-(thiocyanato)ethyl]-2-(2,4-dichlorophenoxy)
  acetamide,
N-[2-(thiocyanato)ethyl]-2-(2,4,5-trichlorophenoxy)
  acetamide,
N-[3-(thiocyanato)propyl]-2-(2,4-dichlorophenoxy)
  acetamide,
N-[2-(thiocyanato)propyl]-3-(p-chlorophenoxy)
  propionamide,
N-[4-(thiocyanato)butyl]-3-(2,4-dichlorophenoxy)
  propionamide,
N-[4-(thiocyanato)butyl]-4-(2,4,5-trichlorophenoxy)
  butyramide, and
N-[5-thiocyanato)amyl]-2-(o-iodophenoxy)acetamide.

Reaction of the N-bromoalkyl)halophenoxyacylamides with an alkali metal thiocyanate to give the presently provided N-(thiocyanatoalkyl)halophenoxyacylamides is conducted by simply mixing the two reactants in substantially equimolar proportion in a suitable solvent and stirring until formation of said thiocyanatoalkyl compound is completed. As solvent there may be used dimethylformamide, acetone, 1-methyl-2-pyrrolidinone, etc.

Since formation of the present thiocyanatoalkyl compounds takes place by reaction of one mole of the bromoalkyl compounds with one mole of the alkali metal thiocyanate, these reactants are advantageously employed in such proportions. A substantial excess of the alkali metal thiocyanate may be employed, however, without deleterious results; the excess is readily separated from the product at the conclusion of the reaction.

Generally, the reaction is exothermic; hence, heating is usually not required and the reaction may be conducted by operating at ambient temperatures, or even with cooling. However, to shorten the reaction time and to achieve maximum production for a given size reaction vessel, it may be desirable to supply heat. Temperatures of from, say 30° C. to 85° C. are thus useful.

For the separation of the product from co-formed alkali metal bromide it is a simple matter to dilute the reaction mixture with water and thereby precipitate the difficultly soluble thiocyanatoalkyl compound; the dissolved alkali metal bromide may thereupon be discarded. Recrystallization of the crude product from a suitable organic solvent, e.g., ethanol yields the substantially pure product.

The N - (thiocyanatoalkyl)halophenoxyacylamides are generally crystalline solids soluble in organic solvents such as ethanol, acetone, etc.

The present compounds are unusual in that they may be used as either fungicides or herbicides. Their activity as fungicides is so great that they are ordinarily effective at a very low concentration, e.g., at less than 0.01%. When used against *Venturia inaequalis* on apple trees, e.g., a 0.001% concentration of N-[2-thiocyanato)ethyl]-2-(2,4-dichlorophenoxy)acetamide is very effective without damaging the host plant. For herbicidal activity, these compounds are ordinarily employed at concentrations of over 0.01%, as shown in Example 3. It is believed that one skilled in the art can readily determine from this disclosure, including the examples, the optimum rate to be applied in any particular case.

When employed as agricultural fungicides they may be used to treat soil in seedbeds or treat seeds, or may be applied to the foliage, fruit buds or fruit of plants. They may be applied as a dust, with an inert solid carrier such as clay or talc, or as a liquid or spray in a liquid carrier, such as in solution in a suitable solvent or in suspension in a non-solvent. Still another method of application is as an aerosol, prepared either by dissolving in a highly volatile liquid carrier, or by dispersing in a gas by thermal means or aerosol-generators. Preferably when applied in an aqueous suspension or an oil-water emulsion, the composition contains additives which may serve to disperse the chemical or to aid in uniform application. The present compounds may be employed as the sole active material or with other biologically active compounds, including other fungicides, fumigants, bactericides, insecticides, fertilizers, hormones, or antibiotics.

The present compounds are also effective as fungicides in protecting cloth, fibers, paper, leather, wood, or resins.

The invention is further illustrated by, but not limited to the following examples.

Example 1

This example shows the preparation of N-[2-(thiocyanato)-ethyl]-2-(2,4-dichlorophenoxy)acetamide.

To a solution of 7.5 g. (0.077 mole) of potassium thiocyanate in about 50 ml. of dimethylformamide was added a solution of 25 g. (0.077 mole) of N-(2-bromoethyl)-2-(2,4-dichlorophenoxy)-acetamide (J. Org. Chem. 15, 694 (1950)) in about 125 ml. of dimethylformamide. The temperature of the mixture was maintained at about 50° C. for 7 hours. It was then cooled, and about 250 ml. of water was added to precipitate a solid crude product. Recrystallization from ethanol gave 12.7 g. pure product (55% yield) melting at 97.5–99.5° C. It analyzed as follows:

Analysis.—Calcd. for $C_{11}H_{10}Cl_2N_2O_2S$: C, 43.28%; H, 3.30%; Cl, 23.23%; N, 9.18%; S, 10.51%. Found: C, 43.13%; H, 3.28%; Cl, 23.32%; N, 9.05%; S, 10.22%.

Example 2

This example shows activity against *Venturia inaequalis* (apple scab).

Selected young apple trees were used as the host. A stock solution of the compound of Example 1 in acetone, containing one drop of "Tween 80" (a non-ionic surface active agent, essentially sorbitan monooleate) per 10 ml. of solution, was diluted with water to a concentration of 10 p.p.m. The trees were sprayed uniformly with the mixture, dried for 24 hours, and then inoculated with a spore suspension of *Venturia inaequalis conidia* containing approximately 2,500,000 spores per ml. of water. Immediately thereafter the plants were placed in an incubation chamber at 100% relative humidity and kept there for 72 hours. They were then stored in the greenhouse for 2 weeks and evaluated at the end of that time. Excellent control of *Venturia inaequalis* was indicated by the few number of parasitized leaves found as compared to the number of parasitized leaves found on trees treated in a similar manner with a commercial fungicide. There was practically no injury to the apple trees.

Example 3

This example shows activity as a contact herbicide.

The compound of Example 1 was applied in spray form to 21-day old specimens of grasses and broadleaf plants. The plants were grown in 9½″ x 5¾″ x 2¾″ pans from five seeds of each of radish, morning glory and tomato; 10 seeds of each of sugar beet, sorghum and brome grass; 20 seeds of each of wild buckwheat, giant foxtail, rye grass, wild oat; approximately 20 to 30 seeds of each of pigweed and crab grass; and two soybean seeds in diagonally opposite corners. After the plants were 21 days old, each pan was sprayed with 6 ml. of a 0.5% concentration solution of the candidate chemical, corresponding to a rate of approximately 9 lbs. per acre. This herbicidal solution was prepared from 1.5 ml. of a 2% solution of the canididate compound in acetone, 0.2 ml. of a cyclohexanone-emulsifying agent mix, and sufficient water to make a volume of 6 ml. The emulsifying agent was a mixture comprising 35 weight percent butylamine dodecylbenzenesulfonate and 65 weight percent of a tall oil-ethylene oxide condensate having about 6 moles of ethylene oxide per mole of tall oil. The injuries to the plants were then observed 14 days later and are reported in Table 1. The plant types are represented by letters as follows:

A—General grass
B—General broadleaf
C—Morning glory
D—Wild oats
E—Brome grass
F—Rye grass
G—Radish
H—Sugar beet
I—Cotton
J—Corn
K—Foxtail
L—Barnyard grass
M—Crab grass
N—Pigweed
O—Soybean
P—Wild buckwheat
Q—Tomato
R—Sorghum
S—Rice Sprays having a 0.05% and a 0.01% concentration of the test compound were prepared by diluting the 0.5% concentration, and these dilute solutions were similarly tested. General grass and general broadleaf were tested by using random mixtures of the two types and spraying them as above described. Cotton, corn, rice and barnyard grass were also employed in similar tests.

The herbicidal ratings recorded in Table 1 are defined as follows:

0—No phytoxicity
1—Slight phytoxicity
2—Moderate phytoxicity
3—Severe phytoxicity
4—Plant dead

TABLE I.—PLANT TYPE

| Conc., wt. | A | B | C | D | E | F | G | H | I | J | K | L | M | N | O | P | Q | R | S |
|---|---|---|---|---|---|---|---|---|---|---|---|---|---|---|---|---|---|---|---|
| 0.5 | 1 | 3 | 4 | 1 | 1 | 1 | 4 | 4 | | | 2 | | 2 | 4 | 3 | 4 | 4 | 2 | |
| 0.05 | 0 | 2 | 4 | 0 | 0 | 0 | 3 | 4 | 3 | 0 | 0 | 0 | 0 | 4 | 3 | 3 | 4 | 0 | 0 |
| 0.01 | 0 | 2 | 3 | 0 | 0 | 0 | 3 | 3 | 3 | 0 | 0 | 0 | 0 | 3 | 1 | 4 | 3 | 0 | 0 |

What is claimed is:

1. A N-(thiocyanatoalkyl)halophenoxyacylamide of the formula $$\underset{(X)_m}{\text{C}_6\text{H}_{4-m}}-O-(CH_2)_n\overset{O}{\underset{\|}{C}}-NH-Y-SCN$$

wherein X is halogen having an atomic weight greater than 30, Y is alkylene having from 2 to 5 carbon atoms, m is an integer of from 1 to 5, and n is an integer of from 1 to 3.

2. A compound as described in claim 1 where n=1.
3. A compound as described in claim 1 where X is chlorine and n=1.
4. A compound as described in claim 1 where X is chlorine, m=2, n=1 and Y is ethylene.

References Cited

UNITED STATES PATENTS 2,617,818  11/1952  Mowry _____ 260—454
3,141,818   7/1964  Stephens et al. _____ 167—30

CHARLES B. PARKER, *Primary Examiner.*

DOLPH H. TORRENCE, *Assistant Examiner.*

U.S. Cl. X.R.

71—104; 424—302